(12) United States Patent
Wu et al.

(10) Patent No.: US 12,287,527 B2
(45) Date of Patent: Apr. 29, 2025

(54) OPTICAL ELEMENT DRIVING MECHANISM

(71) Applicant: TDK TAIWAN CORP., Taoyuan (TW)

(72) Inventors: Ya-Hsiu Wu, Taoyuan (TW); Ying-Jen Wang, Taoyuan (TW); Yi-Ho Chen, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 567 days.

(21) Appl. No.: 17/675,788

(22) Filed: Feb. 18, 2022

(65) Prior Publication Data

US 2022/0308306 A1 Sep. 29, 2022

Related U.S. Application Data

(60) Provisional application No. 63/167,300, filed on Mar. 29, 2021.

(51) Int. Cl.
| | |
|---|---|
| *G02B 7/08* | (2021.01) |
| *G02B 7/04* | (2021.01) |
| *G02B 27/64* | (2006.01) |
| *G03B 3/10* | (2021.01) |
| *G03B 5/00* | (2021.01) |
| *G03B 11/04* | (2021.01) |
| *H01F 7/02* | (2006.01) |
| *H01F 7/08* | (2006.01) |

(52) U.S. Cl.
CPC ............. *G02B 7/08* (2013.01); *G02B 7/04* (2013.01); *G02B 27/646* (2013.01); *G03B 3/10* (2013.01); *G03B 5/00* (2013.01); *G03B 11/043* (2013.01); *H01F 7/02* (2013.01); *H01F 7/081* (2013.01); *G03B 2205/0007* (2013.01); *G03B 2205/0053* (2013.01)

(58) Field of Classification Search
CPC .......... G02B 7/08; G02B 7/04; G02B 27/646; G02B 7/09; G03B 11/043; G03B 2205/0007; G03B 2205/0053; G03B 3/10; G03B 5/00; G03B 30/00; H01F 7/02; H01F 7/081
See application file for complete search history.

(56) References Cited

U.S. PATENT DOCUMENTS

| | | | |
|---|---|---|---|
| 11,740,428 B2* | 8/2023 | Hung | G03B 3/10 |
| | | | 396/448 |
| 2012/0093496 A1* | 4/2012 | Liu | G03B 11/043 |
| | | | 396/439 |
| 2020/0127548 A1* | 4/2020 | Yeon | G03B 5/00 |
| 2020/0174272 A1* | 6/2020 | Minamisawa | G03B 5/04 |
| 2022/0091479 A1* | 3/2022 | Sawanobori | G03B 11/043 |
| 2022/0283407 A1* | 9/2022 | Wu | G03B 5/00 |

\* cited by examiner

*Primary Examiner* — Sharrief I Broome
*Assistant Examiner* — K Muhammad
(74) *Attorney, Agent, or Firm* — MUNCY, GEISSLER, OLDS & LOWE, P.C.

(57) ABSTRACT

An optical element driving mechanism is provided, including a movable part, a fixed part, and a driving assembly. The movable part is for connecting an optical element. The movable part is movable relative to the fixed part. The driving assembly is for driving the movable part to move relative to the fixed part. The optical element is used to correspond to an electromagnetic wave.

19 Claims, 8 Drawing Sheets

OPTICAL ELEMENT DRIVING MECHANISM

CROSS REFERENCE TO RELATED APPLICATIONS

This application claims the benefit of U.S. Provisional Application No. 63/167,300, filed 29 Mar. 2021, the entirety of which is incorporated by reference herein.

BACKGROUND OF THE INVENTION

Field of the Invention

The present disclosure relates to an optical element driving mechanism, and more particularly to an optical element driving mechanism in an electrical device.

Description of the Related Art

As the relevant technologies have been developed, many electronic devices (such as computers and tablets) have been equipped with the capability to record images and videos. However, when an optical element (such as a lens) having a long focal length is provided in an electronic device, the thickness of the electronic device may be increased, impeding the prospects for miniaturization of the electronic device. Therefore, how to design an optical element driving mechanism and an optical device that help to miniaturize the electronic device has become an important issue.

BRIEF SUMMARY OF THE INVENTION

To solve the problems of the prior art, an optical element driving mechanism is provided, including a movable part, a fixed part, and a driving assembly. The movable part is for connecting an optical element. The movable part is movable relative to the fixed part. The driving assembly is for driving the movable part to move relative to the fixed part. The optical element is used to correspond to an electromagnetic wave.

In one of the embodiments of the present disclosure, the movable part further includes a movable part setting surface. The movable part setting surface is parallel to a first axis. The movable part setting surface is perpendicular to a second axis. The movable part setting surface is parallel to a third axis. The first axis is perpendicular to the third axis. The second axis is perpendicular to the first axis. The second axis is perpendicular to the third axis. The optical element driving mechanism having an elongated structure extends along the first axis when viewed along the second axis. The driving assembly is used for driving the optical element to move relative to the fixed part in a first dimension. The first dimension is a rotation about a first rotation axis. The first rotation axis is parallel to the first axis.

In one of the embodiments of the present disclosure, the optical element driving mechanism further includes a sensing assembly and a stopping assembly. The sensing assembly is used for sensing the movement of a movable part frame of the movable part relative to the fixed part. The sensing assembly includes: a reference element; and a sensing element, corresponding to the reference element, and used for outputting a sensing signal. The reference element is movable relative to the sensing element. The sensing element outputs the sensing signal between a first extreme value and a second extreme value. There is an intermediate value between the first extreme value and the second extreme value.

In one of the embodiments of the present disclosure, the stopping assembly is used for limiting the movement of the movable part frame relative to the fixed part within a first moving range. When the movable part frame moves relative to the fixed part within the first moving range, the sensing signal is within a first setting range. The first setting range is narrower than a first total range. The first total range is defined as the difference between the second extreme value and the first extreme value.

In one of the embodiments of the present disclosure, the interval of the first setting range includes the intermediate value. The interval of the first setting range does not include the first extreme value. The interval of the first setting range does not include the second extreme value. The avoidance range is defined as five percent of the first total range. An applicable range is defined as a value that is respectively narrowed by the first extreme value and the second extreme value from the avoidance range.

In one of the embodiments of the present disclosure, the first setting range is narrower than the applicable range. The first setting range is within the applicable range. The first setting range is defined as the difference between a second setting value and a first setting value. The first setting value is within the applicable range. The second setting value is within the applicable range.

In one of the embodiments of the present disclosure, the reference element is used to generate a first magnetic field. The sensing element senses the rotation of the movable part frame by sensing the change of the magnetic field direction of the first magnetic field. The sensing element includes a first magnetoresistive sensor. The sensing element includes: a fixed layer, having a fixed magnetic field, and the fixed magnetic field has a fixed magnetic field direction; a free layer, having a magnetizable material and being magnetized by the ambient magnetic field; and an intermediate layer, interposed between the fixed layer and the free layer.

In one of the embodiments of the present disclosure, when the ambient magnetic field overlaps the free layer, the free layer is magnetized along the magnetization direction. The magnetization direction is parallel to a first imaginary line, and the fixed magnetic field direction is parallel to a second imaginary line. When the movable part frame is located at any position within the first moving range relative to the fixed part, the first imaginary line is not parallel to the second imaginary line. When the movable part frame is located at any position within the first moving range relative to the fixed part, the included angle between the first imaginary line and the second imaginary line is always greater than 25 degrees.

In one of the embodiments of the present disclosure, the reference element includes a magnetic pole alignment direction, defined as an alignment direction in which the center of a south-seeking pole faces the center of a north-seeking pole. The reference element does not overlap the sensing element when viewed along the first axis. When viewed along the first axis, the alignment direction of the center of the reference element and the center of the sensing element is neither perpendicular nor parallel to the magnetic pole alignment direction. The sensing assembly further includes a magnetic conductive element, the magnetic conductive element includes a magnetic conductive material and corresponds to the reference element.

In one of the embodiments of the present disclosure, when viewed along the first axis, the line that connects the center of the reference element and the center of the sensing element passes through the magnetic conductive element. The sensing element with an elongated structure extends along a long axis when viewed along the first axis. The long axis is not parallel to the magnetic pole alignment direction when viewed along the first axis. The long axis is not perpendicular to the magnetic pole alignment direction when viewed along the first axis. The driving assembly partially overlaps the sensing element when viewed along the first axis. The driving assembly partially overlaps the sensing element when viewed along the third axis.

In one of the embodiments of the present disclosure, the driving assembly includes a first magnetic element, a second magnetic element, a first coil, and a second coil. The first magnetic element of the driving assembly does not overlap the sensing element when viewed along the first axis. The first magnetic element of the driving assembly partially overlaps the sensing element when viewed along the third axis. The second magnetic element of the driving assembly does not overlap the sensing element when viewed along the first axis. The second magnetic element of the driving assembly does not overlap the sensing element when viewed along the third axis.

In one of the embodiments of the present disclosure, the first coil of the driving assembly does not overlap the sensing element when viewed along the first axis. The first coil of the driving assembly partially overlaps the sensing element when viewed along the third axis. The second coil of the driving assembly partially overlaps the sensing element when viewed along the first axis. The second coil of the driving assembly does not overlap the sensing element when viewed along the third axis. The driving assembly is used for driving the movable part frame to move relative to the fixed part in the first dimension. The first dimension is a rotation about a first rotation axis. The first rotation axis is parallel to the first axis.

In one of the embodiments of the present disclosure, the optical element driving mechanism further includes a circuit assembly electrically connected to the driving assembly. The circuit assembly include: a first circuit element, including: a first circuit element first contact, electrically connected to the first coil; and a first circuit element second contact, electrically connected to the second coil; and a second circuit element, including a second circuit element first contact, wherein the second circuit element first contact is electrically connected to the sensing element. The surface of the first circuit element second contact is parallel to the surface of the first circuit element first contact. The surface of the second circuit element first contact is not parallel to the surface of the first circuit element first contact.

In one of the embodiments of the present disclosure, the fixed part includes: a first guiding groove, for accommodating a first wire of the first coil; and a second guiding groove, for accommodating a second wire of the second coil. The extending direction of the first guiding groove is not parallel to the extending direction of the second guiding groove. The first circuit element having a plate-like structure is not parallel to the second circuit element having a plate-like structure. The first circuit element having a plate-like structure is perpendicular to the second circuit element having a plate-like structure.

In one of the embodiments of the present disclosure, the optical element driving mechanism further includes a control assembly. The driving assembly is used for driving the movable part setting surface of the movable part to move relative to the movable part frame in a second dimension. The second dimension is different from the first dimension. The optical element driving mechanism does not include any detection element for sensing the movement of the movable part setting surface. The driving assembly receives a first driving signal output from the control assembly to drive the movable part frame to move relative to the fixed part. The driving assembly receives a second driving signal output by the control assembly to drive the movable part setting surface to move relative to the movable part frame.

In one of the embodiments of the present disclosure, the control assembly further includes: a first information, including the positional relationship of the sensing signal and the movable part frame relative to the fixed part; and a second information including the positional relationship of the second driving signal and the movable part setting surface relative to the movable part frame. The control assembly outputs the first driving signal according to the sensing signal and the first information. The control assembly and the sensing element have an integrated structure. The control assembly and the sensing element are packaged into the same package.

In one of the embodiments of the present disclosure, the driving assembly further includes: a third coil; a third magnetic element, corresponding to the third coil; a fourth coil; and a fourth magnetic element, corresponding to the fourth coil. The first magnetic element corresponds to the first coil. The second magnetic element corresponds to the second coil. The first magnetic element is fixedly disposed on the movable part frame. The second magnetic element is fixedly disposed on the movable part frame. The third magnetic element is fixedly disposed on the movable part frame. The fourth magnetic element is fixedly disposed on the movable part frame.

In one of the embodiments of the present disclosure, the first coil is fixedly disposed on the fixed part. The second coil is fixedly disposed on the fixed part. The third coil is fixedly disposed on the fixed part. The fourth coil is fixedly disposed on the fixed part. The first coil and the third coil are electrically independent. The first coil is electrically connected to the second coil. The first coil receives the first driving signal to drive the movable part frame to move relative to the fixed part. The third coil receives the second driving signal to drive the movable part setting surface to move relative to the movable part frame. The first driving signal has a first frequency. The second driving signal has a second frequency. The second frequency is different from the first frequency. The second frequency is greater than the first frequency.

In one of the embodiments of the present disclosure, the first coil receives the first driving signal to generate a first driving force. The third coil receives the second driving signal to generate a second driving force. The first driving force is applied to the movable part frame. The second driving force is applied to the movable part frame. The strength of the first driving force is limited to within a first range. The strength of the second driving force is limited to within a second range. The maximum value of the first range is different from the maximum value of the second range. The maximum value of the first range is greater than the maximum value of the second range. The volume of the first magnetic element is different from the volume of the third magnetic element. The volume of the first magnetic element is greater than the volume of the third magnetic element.

In one of the embodiments of the present disclosure, the first magnetic element at least partially overlaps the third magnetic element when viewed along the first axis. The first magnetic element does not overlap the second magnetic element when viewed along the first axis. The first magnetic element does not overlap the second magnetic element when viewed along the third axis. The first magnetic element at least partially overlaps the fourth magnetic element when viewed along the third axis.

BRIEF DESCRIPTION OF THE DRAWINGS

The present invention may be more fully understood by reading the subsequent detailed description and examples with references made to the accompanying drawings, wherein.

DETAILED DESCRIPTION OF THE INVENTION

The making and using of optical element driving mechanisms of embodiments of the present disclosure are discussed in detail below. It should be appreciated, however, that the embodiments provide many applicable inventive concepts that may be embodied in a wide variety of specific contexts. The specific embodiments discussed are merely illustrative of specific ways to make and use the embodiments and do not limit the scope of the disclosure.

It should be understood that, although the terms "first", "second" etc. may be used herein to describe various elements, layers and/or portions, and these elements, layers, and/or portions should not be limited by these terms. These terms are only used to distinguish one element, layer, or portion. Thus, a first element, layer or portion discussed below could be termed a second element, layer or portion without departing from the teachings of some embodiments of the present disclosure. In addition, for the sake of brevity, terms such as "first" and "second" may not be used in the description to distinguish different elements. As long as it does not depart from the scope defined by the appended claims, the first element and/or the second element described in the appended claims can be interpreted as any element that meets the description in the specification.

Unless defined otherwise, all technical and scientific terms used herein have the same meaning as commonly understood by one of ordinary skill in the art to which this disclosure belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

The scale of the drawings in the present disclosure may be drawn according to the actual size. The scale of the same figure in the present disclosure can be used as the actual manufacturing scale of the devices, equipment, elements, etc. of the present disclosure. It should be noted that each figure may be drawn at different orientations, which may result in different size ratios among different figures. However, the size ratio shown in an individual figure is not affect by the different size ratios between different figures. People with ordinary skill in the art can understand that the size ratio of the figures in the present disclosure can be used as a distinguishing feature from the prior art.

Figure 1:
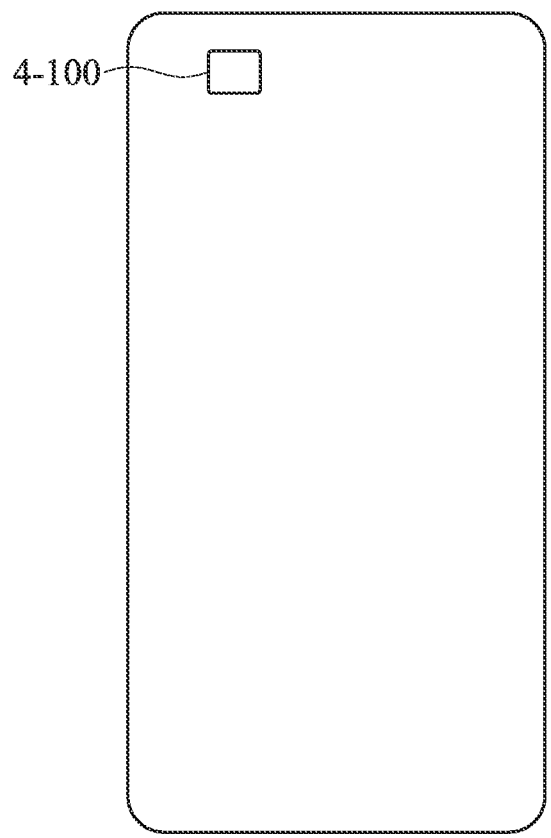
FIG. 1 is a schematic view of an electrical device according to some embodiment of the present disclosure.

Firstly, please refer to FIG. 1, FIG. 1 is a schematic view of an electrical device 4-1 according to some embodiment of the present disclosure. As shown in FIG. 1, an optical element driving mechanism 4-100 of some embodiment of the present disclosure may be mounted in an electrical device 4-1 for taking photos or videos, wherein the aforementioned electrical device 4-1 may, for example, be a smartphone or a digital camera, but the present disclosure is not limited to these. It should be noted that the position and the size between the optical element driving mechanism 4-100 and the electrical device 4-1 shown in FIG. 1 are only an example, which is not for limiting the position and the size between the optical element driving mechanism 4-100 and the electrical device 4-1. In fact, according to different needs, the optical element driving mechanism 4-100 may be mounted at different positions in the electrical device 4-1

Figure 2:
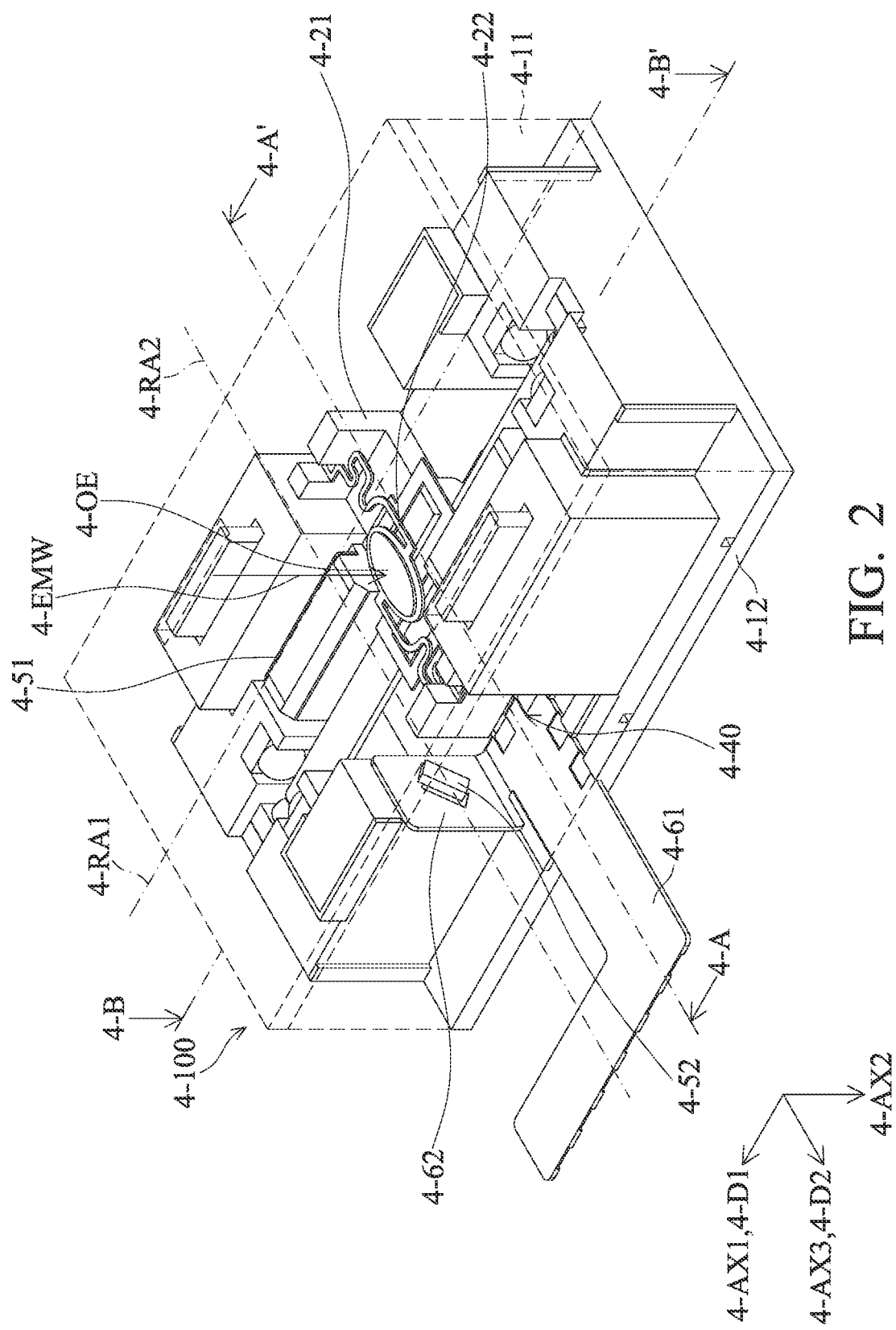
FIG. 2 is a schematic view of an optical element driving mechanism and an optical element according to some embodiments of the present disclosure, wherein an outer frame is shown as a dashed line.
Figure 3:
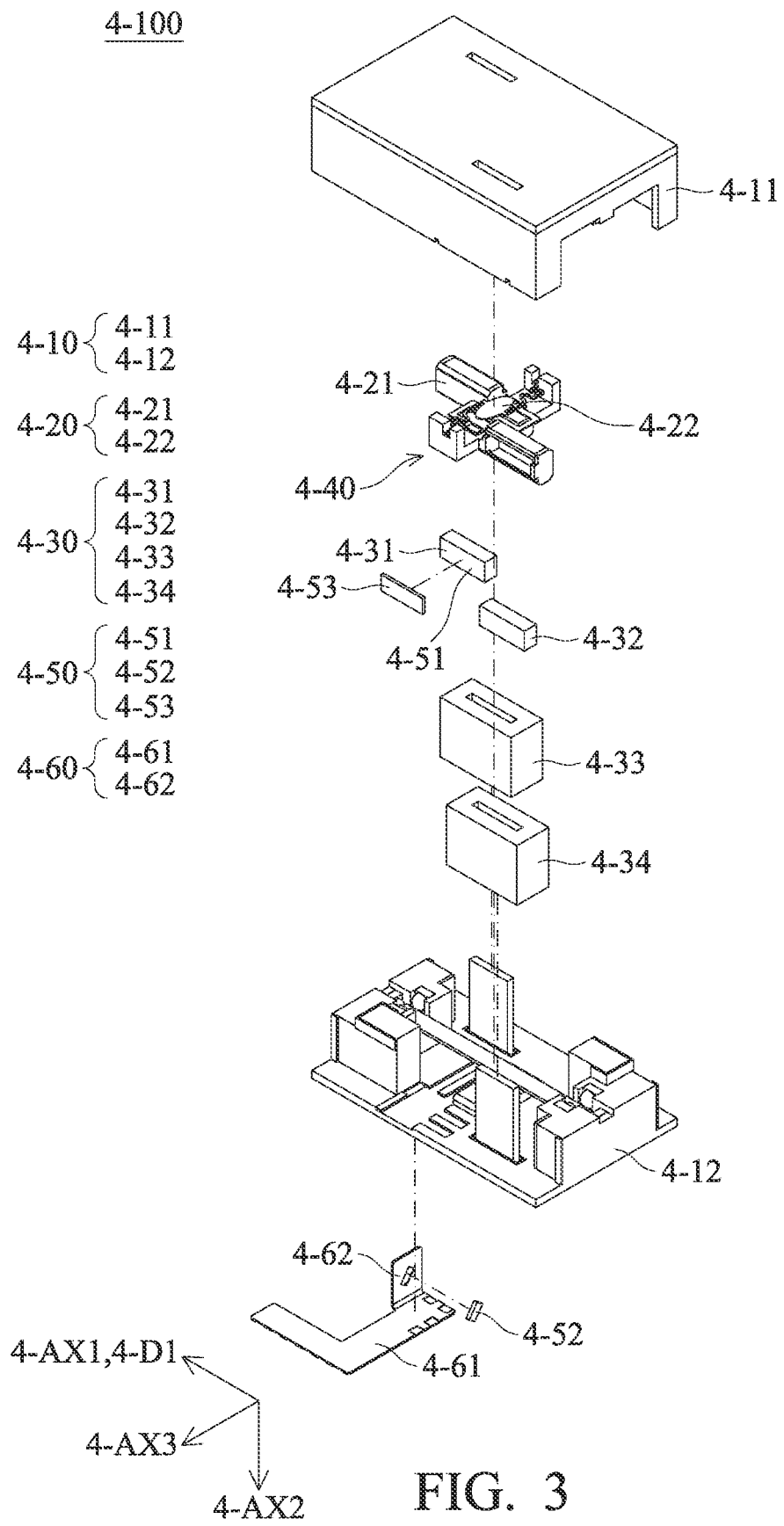
FIG. 3 is an exploded view of the optical element driving mechanism according to some embodiments of the present disclosure.

Please refer to FIG. 2. FIG. 2 is a schematic view of the optical element driving mechanism 4-100 and an optical element 4-OE according to some embodiments of the present disclosure, wherein the outer frame is shown as a dashed line. FIG. 3 is an exploded view of the optical element driving mechanism 4-100 according to some embodiments of the present disclosure.

As shown in FIG. 2 and FIG. 3, the optical element driving mechanism 4-100 may include a fixed part 4-10, a movable part 4-20, a driving assembly 4-30, a stopping assembly 4-40, a sensing assembly 4-50, and a circuit assembly 4-60.

The movable part 4-20 may move relative to the fixed part 4-10, and the driving assembly 4-30 may drive the movable part 4-20 to move relative to the fixed part 4-10. According to some embodiments of the present disclosure, the movable part 4-20 may be connected to an optical element 4-OE.

According to some embodiments of the present disclosure, the optical element 4-OE may correspond to an electromagnetic wave 4-EMW. For example, the electromagnetic wave 4-EMW may be incident to the optical element 4-OE. For example, according to some embodiments of the present disclosure, the electromagnetic wave 4-EMW may be visible light, infrared light, ultraviolet light, and the like.

The fixed part 4-10 may include an outer frame 4-11, and a base 4-12. The outer frame 4-11 may be disposed on the base 4-12, so as to form an inner space and to accommodate the elements of the optical element driving mechanism 4-100.

The movable part 4-20 may include a movable part frame 4-21, and a movable part setting surface 4-22.

The driving assembly 4-30 may include a first magnetic element 4-31, a second magnetic element 4-32, a first coil 4-33, and a second coil 4-34.

According to some embodiments of the present disclosure, the movable part setting surface 4-22 may be parallel to a first axis 4-AX1. According to some embodiments of the present disclosure, the movable part setting surface 4-22 may be perpendicular to a second axis 4-AX2. According to some embodiments of the present disclosure, the movable part setting surface 4-22 may be parallel to a third axis 4-AX3.

According to some embodiments of the present disclosure, the first axis 4-AX1 may be perpendicular to the second axis 4-AX2. According to some embodiments of the present disclosure, the first axis 4-AX1 may be perpendicular to the third axis 4-AX3. According to some embodiments of the present disclosure, the second axis 4-AX2 may be perpendicular to the third axis 4-AX3.

According to some embodiments of the present disclosure, the optical element driving mechanism 4-100 may have an elongated structure when viewed along the second axis 4-AX2. According to some embodiments of the present disclosure, the optical element driving mechanism 4-100 may extend along the first axis 4-AX1.

According to some embodiments of the present disclosure, the driving assembly 4-30 may be used to drive the optical element 4-OE to move relative to the fixed part 4-10 in a first dimension 4-D1.

According to some embodiments of the present disclosure, the driving assembly 4-30 may be used to drive the movable part frame 4-21 to move relative to the fixed part 4-10 in the first dimension 4-D1.

According to some embodiments of the present disclosure, the first dimension 4-D1 may be a rotation about a first rotation axis 4-RA1. According to some embodiments of the present disclosure, the first rotation axis 4-RA1 may be parallel to the first axis 4-AX1.

According to some embodiments of the present disclosure, the driving assembly 4-30 may be used to drive the movable part setting surface 4-22 of the movable part 4-20 to move relative to the movable part frame 4-21 in a second dimension 4-D2.

According to some embodiments of the present disclosure, the second dimension 4-D2 is different from the first dimension 4-D1. According to some embodiments of the present disclosure, the second dimension 4-D2 may be perpendicular to the first dimension 4-D1.

According to some embodiments of the present disclosure, the second dimension 4-D2 may be a rotation about a second rotation axis 4-RA2. According to some embodiments of the present disclosure, the second axis 4-RA2 may be parallel to the third axis 4-AX3.

According to some embodiments of the present disclosure, the sensing assembly 4-50 may be used to sense the movement of the movable part frame 4-21 of the movable part 4-20 relative to the fixed part 4-10. The sensing assembly 4-50 may include a reference element 4-51, a sensing element 4-52, and a magnetic conductive element 4-53.

According to some embodiments of the present disclosure, the circuit assembly 4-60 may be electrically connected to the driving assembly 4-30. According to some embodiments of the present disclosure, the circuit assembly 4-64) may include a first circuit element 4-61 and a second circuit element 4-62.

Figure 4:
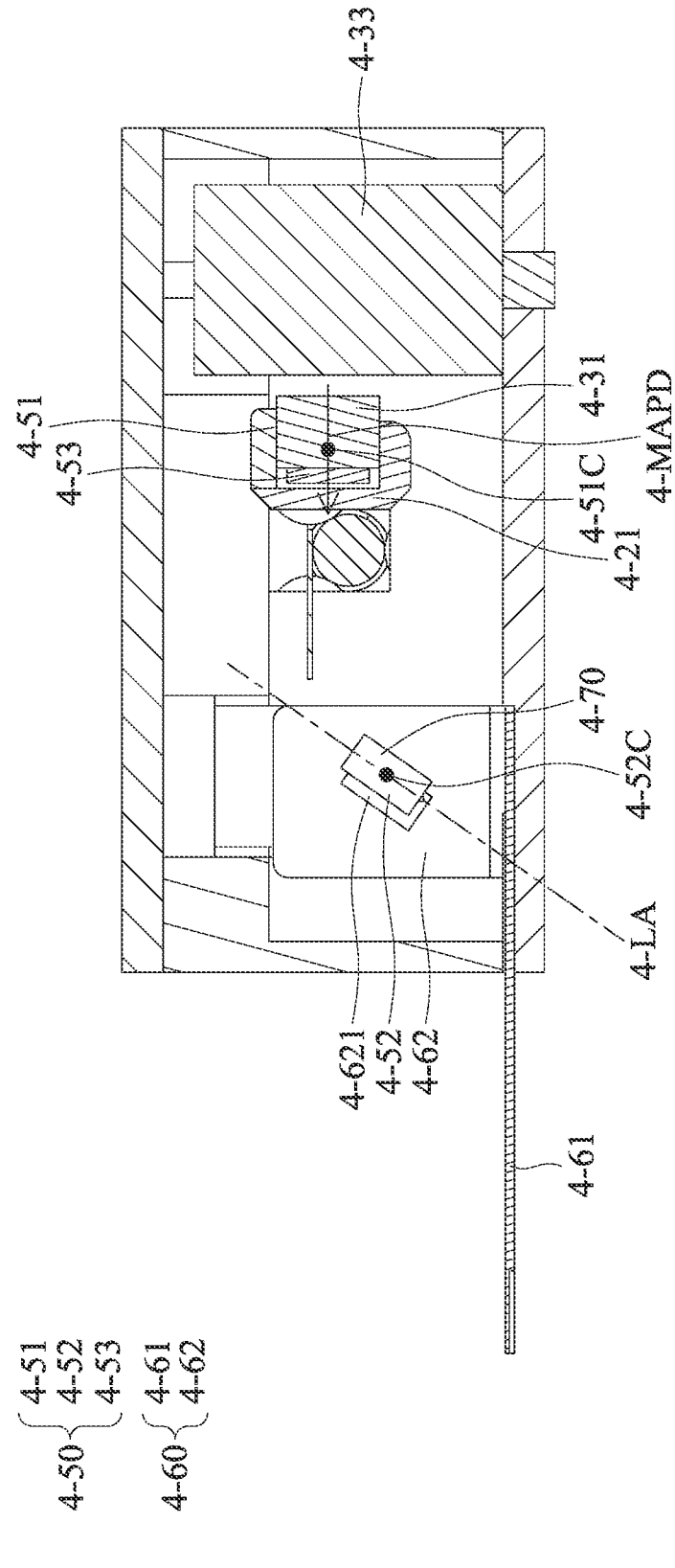
FIG. 4 is a cross-sectional view of the optical element driving mechanism along line 4-A-4-A' of FIG. 2, according to some embodiments of the present disclosure.

Please refer to FIG. 4, FIG. 4 is a cross-sectional view of the optical element driving mechanism 4-100 along line 4-A-4-A' of FIG. 2, according to some embodiments of the present disclosure.

According to some embodiments of the present disclosure, the sensing element 4-52 may be disposed to correspond to the reference element 4-51, and the sensing element 4-52 may be used for outputting a sensing signal. According to some embodiments of the present disclosure, the reference element 4-51 may move relative to the sensing element 4-52.

Figure 5:
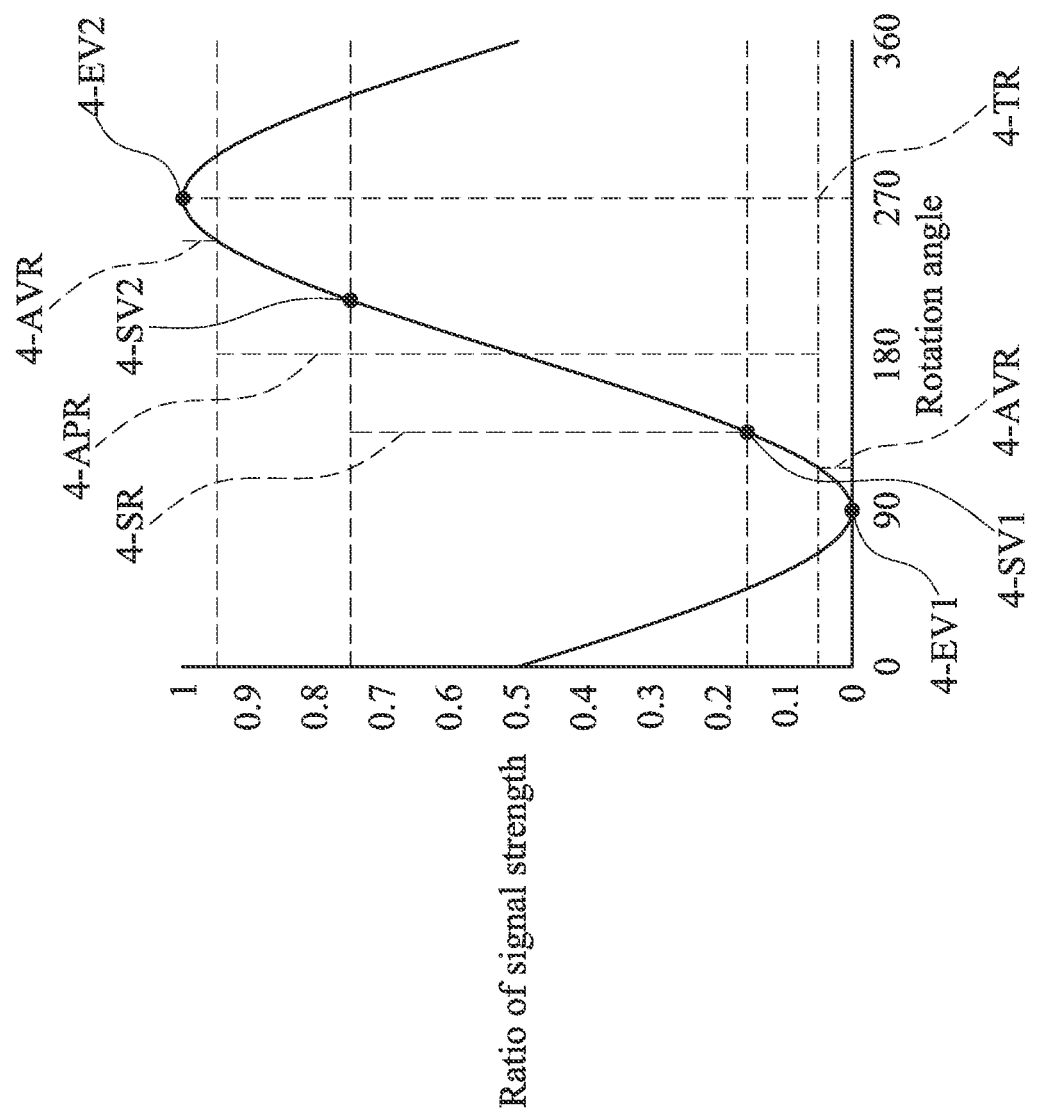
FIG. 5 is a schematic view of a sensing signal output by a sensing element of the optical element driving mechanism according to some embodiments of the present disclosure.

Please refer to FIG. 5. FIG. 5 is a schematic view of a sensing signal output by the sensing element 4-52 of the optical element driving mechanism 4-100 according to some embodiments of the present disclosure.

According to some embodiments of the present disclosure, the sensing element 4-52 may output a sensing signal between a first extreme value 4-EV1 and a second extreme value 4-EV2. According to some embodiments of the present disclosure, there may be an intermediate value between the first extreme value 4-EV1 and the second extreme value 4-EV2.

According to some embodiments of the present disclosure, the stopping assembly 4-40 may be used to limit the movement of the movable part frame 4-21 relative to the fixed part 4-10 within a first moving range. The first moving range may be defined by a first position of the movable part frame 4-21 and a second position of the movable part frame 4-21.

According to some embodiments of the present disclosure, when the movable part frame 4-21 moves relative to the fixed part 4-10 within the first moving range, the sensing signal may be within a first setting range 4-SR.

According to some embodiments of the present disclosure, the first setting range 4-SR may be narrower than a first total range 4-TR. According to some embodiments of the present disclosure, the first total range 4-TR may be defined as the difference between the second extreme value 4-EV2 and the first extreme value 4-EV1.

According to some embodiments of the present disclosure, the interval of the first setting range 4-SR may include intermediate values. According to some embodiments of the present disclosure, the interval of the first setting range 4-SR may not include the first extreme value 4-EV1. According to some embodiments of the present disclosure, the interval of the first setting range 4-SR may not include the second extreme value 4-EV2.

According to some embodiments of the present disclosure, an avoidance range 4-AVR may be defined as five percent of the first total range 4-TR.

According to some embodiments of the present disclosure, an applicable range 4-APR may be defined as a value that is respectively narrowed by the first extreme value 4-EV1 and the second extreme value 4-EV2 from the avoidance range 4-AVR. For example, the applicable range 4-APR may be ten percent narrower than the first total range 4-TR.

According to some embodiments of the present disclosure, the first setting range 4-SR may be narrower than the applicable range 4-APR. According to some embodiments of the present disclosure, the first setting range 4-SR may be within the applicable range 4-APR.

According to some embodiments of the present disclosure, the first setting range 4-SR may be defined as the difference between a second setting value 4-SV2 and a first setting value 4-SV1.

According to some embodiments of the present disclosure, the first setting value 4-SV1 is within the applicable range 4-APR. According to some embodiments of the present disclosure, the second setting value 4-SV2 is within the applicable range 4-APR.

In this way, the accuracy of the sensing element 4-52 may be increased, thereby the operation of the optical element driving mechanism 4-100 is smoother.

Figure 6:
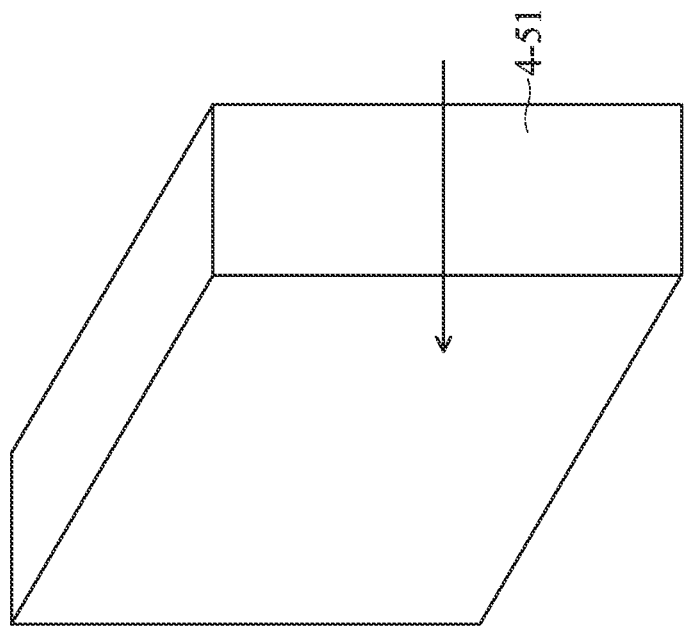
FIG. 6 is a schematic view of a reference element and the sensing element of the optical element driving mechanism according to some embodiments of the present disclosure, wherein the arrows represent the magnetic field direction.
Figure 6:
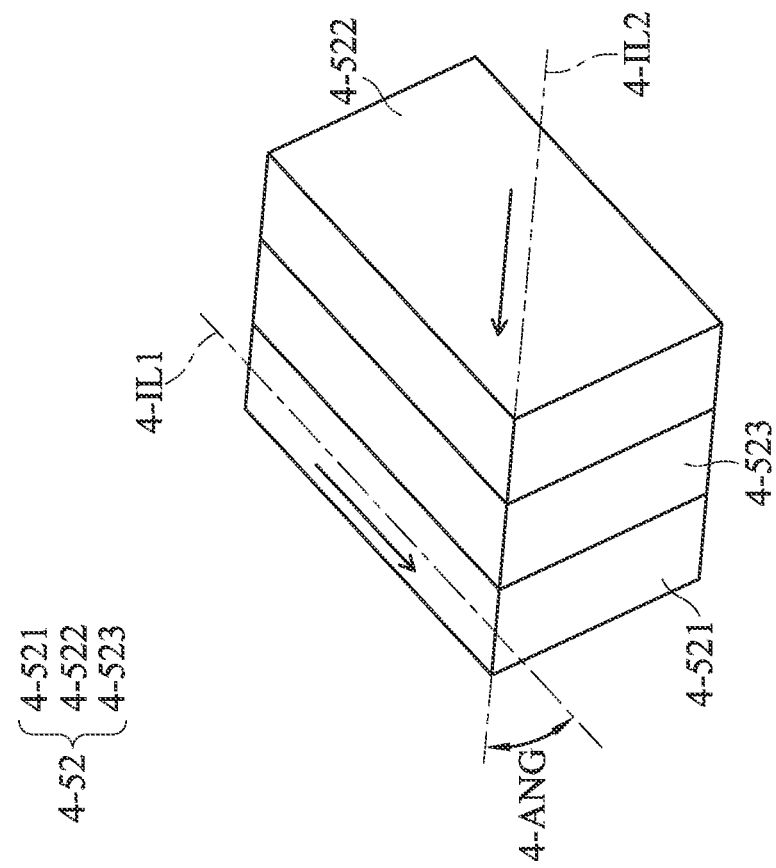

Please refer to FIG. 6. FIG. 6 is a schematic view of the reference element 4-51 and the sensing element 4-52 of the optical element driving mechanism 4-100 according to some embodiments of the present disclosure, wherein the arrows represent the magnetic field direction.

According to some embodiments of the present disclosure, the reference element 4-51 may be used to generate a first magnetic field.

According to some embodiments of the present disclosure, the sensing element 4-52 may sense the rotation of the movable frame 4-21 by sensing the change of the magnetic field direction of the first magnetic field.

According to some embodiments of the present disclosure, the sensing element 4-52 includes a first magnetoresistive sensor. For example, the sensing elements 4-52 may include a tunnel magnetoresistance (TMR) sensor, a giant magnetoresistance (GMR) sensor, and the like.

According to some embodiments of the present disclosure, the sensing element 4-52 may include a fixed layer 4-521, a free layer 4-522, and an intermediate layer 4-523.

According to some embodiments of the present disclosure, the fixed layer 4-521 may have a fixed magnetic field. The fixed magnetic field may have a fixed magnetic field direction. The free layer 4-522 may have a magnetizable material, and the free layer 4-522 may be magnetized by an ambient magnetic field (e.g., the magnetic field of the reference element 4-51). The intermediate layer 4-523 may be interposed between the fixed layer 4-521 and the free layer 4-522.

According to some embodiments of the present disclosure, w % ben the ambient magnetic field overlaps the free layer 4-522, the free layer 4-522 may be magnetized along the magnetization direction.

According to some embodiments of the present disclosure, the magnetization direction is parallel to a first imaginary line 4-IL1, and the fixed magnetic field direction is parallel to a second imaginary line 4-IL2.

According to some embodiments of the present disclosure, when the movable part frame 4-21 is located at any position within the first moving range relative to the fixed part 4-10, the first imaginary line 4-IL1 may not be parallel to the second imaginary line 4-IL2.

According to some embodiments of the present disclosure, when the movable part frame 4-21 is located at any position within the first moving range relative to the fixed part 4-10, the included angle 4-ANG between the first imaginary line 4-IL1 and the second imaginary line 4-IL2 may be greater than 25 degrees.

According to some embodiments of the present disclosure, the included angle 4-ANG between the first imaginary line 4-IL1 and the second imaginary line 4-IL2 may be an obtuse angle. According to some embodiments of the present disclosure, the included angle 4-ANG between the first imaginary line 4-IL1 and the second imaginary line 4-IL2 may be an acute angle.

According to some embodiments of the present disclosure, no matter the included angle 4-ANG between the first imaginary line 4-IL1 and the second imaginary line 4-IL2 is an obtuse angle or an acute angle, the included angle 4-ANG between the first imaginary line 4-IL1 and the second imaginary line 4-IL2 is always greater than 25 degrees.

In this way, the accuracy of the sensing element 4-52 may be increased, thereby the operation of the optical element driving mechanism 4-100 is smoother.

Please refer to FIG. 4, the reference element 4-51 may include a magnetic pole alignment direction 4-MPAD. It should be noted that the magnetic pole alignment direction 4-MPAD may be defined as an alignment direction in which the center of a south-seeking pole faces the center of a north-seeking pole.

According to some embodiments of the present disclosure, the reference element 4-51 may not overlap the sensing element 4-52 when viewed along the first axis 4-AX1.

According to some embodiments of the present disclosure, when viewed along the first axis 4-AX1, the alignment direction of the center 4-51C of the reference element 4-51 and the center 4-52C of the sensing element 4-52 may be neither perpendicular nor parallel to the magnetic pole alignment direction 4-MPAD.

In this way, the accuracy of the sensing element 4-52 may be increased, thereby the operation of the optical element driving mechanism 4-100 is smoother. In addition, the internal space of the optical element driving mechanism 4-100 may be effectively used, thereby the effect of miniaturization is achieved.

According to some embodiments of the present disclosure, the magnetic conductive element 4-53 of the sensing assembly 4-50 may include a magnetic conductive material, and the magnetic conductive element 4-53 may correspond to the reference element 4-51.

Figure 7:
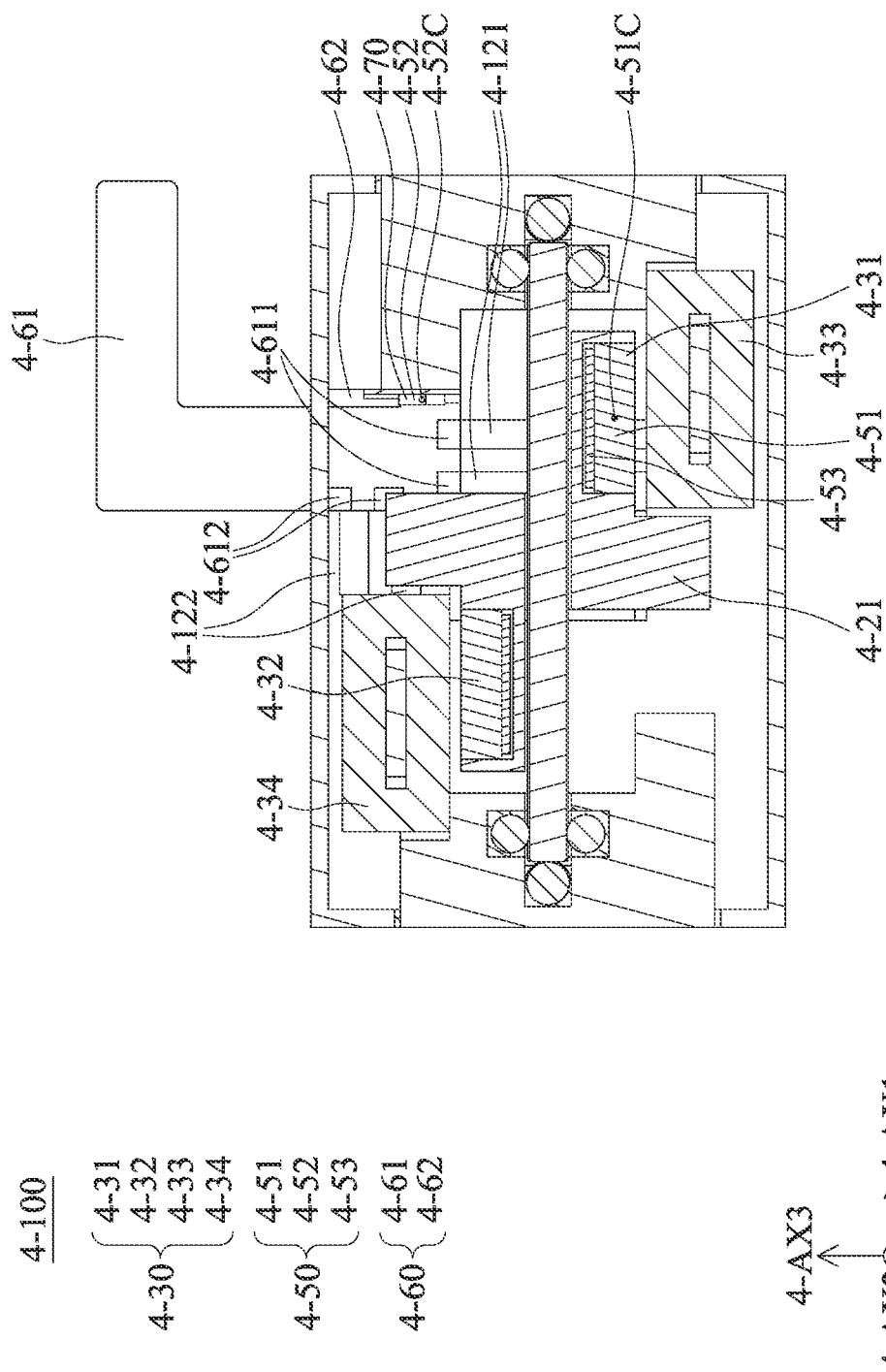
FIG. 7 is a cross-sectional view of the optical element driving mechanism along line 4-B-4-B' of FIG. 2, according to some embodiments of the present disclosure.

Please refer to FIG. 4 and FIG. 7. FIG. 7 is a cross-sectional view of the optical element driving mechanism 4-100 along line 4-B-4-B' of FIG. 2, according to some embodiments of the present disclosure.

According to some embodiments of the present disclosure, when viewed along the first axis 4-AX1, the line that connects the center 4-51C of the reference element 4-51 and the center 4-52C of the sensing element 4-52 may pass through the magnetic conductive element 4-53.

In this way, the accuracy of the sensing element 4-52 may be increased, thereby the operation of the optical element driving mechanism 4-100 is smoother. In addition, the internal space of the optical element driving mechanism 4-100 may be effectively used, thereby the effect of miniaturization is achieved.

According to some embodiments of the present disclosure, the sensing element 4-52 having an elongated structure may extend along a long axis 4-LA when viewed along the first axis 4-AX1.

According to some embodiments of the present disclosure, the long axis 4-LA may not be parallel to the magnetic pole alignment direction 4-MPAD when viewed along the first axis 4-AX1.

According to some embodiments of the present disclosure, the long axis 4-LA may not be perpendicular to the magnetic pole alignment direction 4-MPAD when viewed along the first axis 4-AX1.

According to some embodiments of the present disclosure, the long axis 4-LA may not pass through the reference element 4-51 when viewed along the first axis 4-AX1.

In this way, the accuracy of the sensing element 4-52 may be increased, thereby the operation of the optical element driving mechanism 4-100 is smoother. In addition, the internal space of the optical element driving mechanism 4-100 may be effectively used, thereby the effect of miniaturization is achieved.

Please refer to FIG. 4, according to some embodiments of the present disclosure, the driving assembly 4-30 may partially overlap the sensing element 4-52 when viewed along the first axis 4-AX1.

According to some embodiments of the present disclosure, the driving assembly 4-30 may partially overlap the sensing element 4-52 when viewed along the third axis 4-AX3.

According to some embodiments of the present disclosure, the first magnetic element 4-31 of the driving assembly 4-30 may not overlap the sensing element 4-52 when viewed along the first axis 4-AX1.

According to some embodiments of the present disclosure, the first magnetic element 4-31 may partially overlap the sensing element 4-52 of the driving assembly 4-30 when viewed along the third axis 4-AX3.

According to some embodiments of the present disclosure, the second magnetic element 4-32 of the driving assembly 4-30 may not overlap the sensing element 4-52 when viewed along the first axis 4-AX1.

According to some embodiments of the present disclosure, the second magnetic element 4-32 of the driving assembly 4-30 may not overlap the sensing element 4-52 when viewed along the third axis 4-AX3.

According to some embodiments of the present disclosure, the first coil 4-33 of the driving assembly 4-30 may not overlap the sensing element 4-52 when viewed along the first axis 4-AX1.

According to some embodiments of the present disclosure, the first coil 4-33 of the driving assembly 4-30 may partially overlap the sensing element 4-52 when viewed along the third axis 4-AX3.

According to some embodiments of the present disclosure, the second coil 4-34 of the driving assembly 4-30 may partially overlap the sensing element 4-52 when viewed along the first axis 4-AX1.

According to some embodiments of the present disclosure, the second coil 4-34 of the driving assembly 4-30 may not overlap the sensing element 4-52 when viewed along the third axis 4-AX3.

In this way, the accuracy of the sensing element 4-52 may be increased, thereby the operation of the optical element driving mechanism 4-100 is smoother. In addition, the internal space of the optical element driving mechanism 4-100 may be effectively used, thereby the effect of miniaturization is achieved.

Please refer to FIG. 4 and FIG. 7, according to some embodiments of the present disclosure, the first circuit element 4-61 may include a first circuit element first contact 4-611 and a first circuit element second contact 4-612.

According to some embodiments of the present disclosure, the first circuit element first contact 4-611 may be electrically connected to the first coil 4-33. According to some embodiments of the present disclosure, the first circuit element second contact 4-612 may be electrically connected to the second coil 4-34.

According to some embodiments of the present disclosure, the second circuit element 4-62 may include a second circuit element first contact 4-621. According to some embodiments of the present disclosure, the second circuit element first contact 4-621 may be eclectically connected to the sensing assembly 4-50.

According to some embodiments of the present disclosure, the surface of the first circuit element second contact 4-612 is parallel to the surface of the first circuit element first contact 4-611.

According to some embodiments of the present disclosure, the surface of the second circuit element first contact 4-621 is not parallel to the surface of the first circuit element first contact 4-611.

Please refer to FIG. 4, according to some embodiments of the present disclosure, the base 4-12 of the fixed part 4-10 may include a first guiding groove 4-121 and a second guiding groove 4-122.

According to some embodiments of the present disclosure, the first guiding groove 4-121 may be used to accommodate a first wire (not shown) of the first coil 4-33. According to some embodiments of the present disclosure, the second guide groove 4-122 may be used to accommodate a second wire (not shown) of the second coil 4-34.

According to some embodiments of the present disclosure, the extending direction of the first guiding groove 4-121 may not be parallel to the extending direction of the second guiding groove 4-122.

According to some embodiments of the present disclosure, the first circuit element 4-61 may have a plate-like structure. According to some embodiments of the present disclosure, the second circuit element 4-62 may have a plate-like structure.

According to some embodiments of the present disclosure, the first circuit element 4-61 may not be parallel to the second circuit element 4-62. According to some embodiments of the present disclosure, the first circuit element 4-61 may be perpendicular to the second circuit element 4-62.

In this way, the internal space of the optical element driving mechanism 4-100 may be effectively utilized, thereby the effect of miniaturization is achieved.

According to some embodiments of the present disclosure, the optical element driving mechanism 4-100 may further include a control assembly 4-70.

According to some embodiments of the present disclosure, the optical element driving mechanism 4-100 may not include any detection element for sensing the movement of the movable part setting surface 4-22.

According to some embodiments of the present disclosure, the driving assembly 4-30 may receive a first driving signal output from the control assembly 4-70 to drive the movable part frame 4-21 to move relative to the fixed part 4-10.

According to some embodiments of the present disclosure, the driving assembly 4-30 may receive a second driving signal output by the control assembly 4-70 to drive the movable part setting surface 4-22 to move relative to the movable part frame 4-21.

According to some embodiments of the present disclosure, the control assembly 4-70 may include a first information. The first information may include the positional relationship of the sensing signal and the movable part frame 4-21 relative to the fixed part 4-10.

According to some embodiments of the present disclosure, the control assembly 4-70 may include a second information. The second information may include the positional relationship of the second driving signal and the movable part setting surface 4-22 relative to the movable part frame 4-21.

According to some embodiments of the present disclosure, the control assembly 4-70 may output the first driving signal according to the sensing signal and the first information.

According to some embodiments of the present disclosure, the control assembly 4-70 may be driver ICs. According to some embodiments of the present disclosure, the sensing elements 4-52 may be driving sensors.

According to some embodiments of the present disclosure, the control assembly 4-70 and the sensing element 4-52 may have an integrated structure. According to some embodiments of the present disclosure, the control assembly 4-70 and the sensing element 4-52 may be packaged into the same package (integrated circuit package).

That is, the movement of the movable part frame 4-21 in the first dimension 4-D1 (which may be regarded as the slow axis) relative to the fixed part 4-10 may be precisely controlled using the position sensor. The movement of the movable part setting surface 4-22 in the second dimension 4-D2 (which may be regarded as a fast axis) relative to the movable part frame 4-21 may be precisely controlled without using a position sensor. The amplitude of movement of the movable part setting surface 4-22 relative to the movable part frame 4-21 in the second dimension 4-D2 may be adjust according to the strength of the second driving signal.

Figure 8:
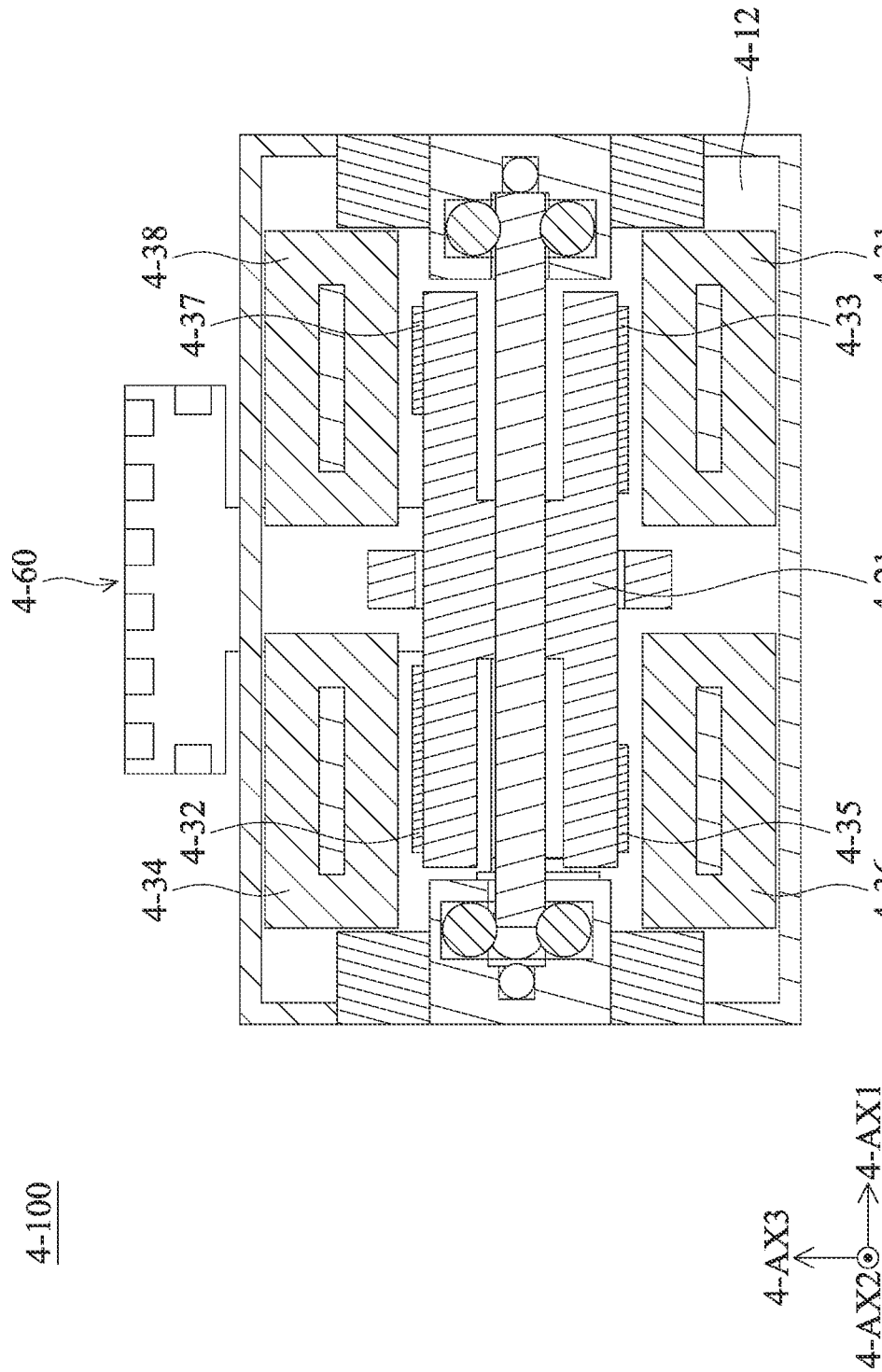
FIG. 8 is a schematic view of a modified embodiment of the optical element driving mechanism according to FIG. 4.

Please refer to FIG. 8, FIG. 8 is a schematic view of a modified embodiment of the optical element driving mechanism 4-100 according to FIG. 4.

As shown in FIG. 8, according to some embodiments of the present disclosure, the driving assembly 4-30 may further include a third magnetic element 4-35, a third coil 4-36, a fourth magnetic element 4-37, and A fourth coil 4-38.

According to some embodiments of the present disclosure, the third magnetic element 4-35 may correspond to the third coil 4-36. According to some embodiments of the present disclosure, the fourth magnetic element 4-37 may correspond to the fourth coil 4-38.

According to some embodiments of the present disclosure, the first magnetic element 4-31 may correspond to the first coil 4-33. According to some embodiments of the present disclosure, the second magnetic element 4-32 may correspond to the second coil 4-34.

According to some embodiments of the present disclosure, the first magnetic element 4-31 may be fixedly disposed on the movable part frame 4-21. According to some embodiments of the present disclosure, the second magnetic element 4-32 may be fixedly disposed on the movable part frame 4-21.

According to some embodiments of the present disclosure, the third magnetic element 4-35 may be fixedly disposed on the movable part frame 4-21. According to some embodiments of the present disclosure, the fourth magnetic element 4-37 may be fixedly disposed on the movable part frame 4-21.

According to some embodiments of the present disclosure, the first coil 4-33 may be fixedly disposed on the base 4-12 of the fixed part 4-10. According to some embodiments of the present disclosure, the second coil 4-34 may be fixedly disposed on the base 4-12 of the fixed part 4-10.

According to some embodiments of the present disclosure, the third coil 4-36 may be fixedly disposed on the base 4-12 of the fixed part 4-10. According to some embodiments of the present disclosure, the fourth coil 4-38 may be fixedly disposed on the base 4-12 of the fixed part 4-10.

According to some embodiments of the present disclosure, the first coil 4-33 may be electrically independent from the third coil 4-36. According to some embodiments of the present disclosure, the first coil 4-33 may be electrically connected to the second coil 4-34.

According to some embodiments of the present disclosure, the second coil 4-34 may be electrically independent from the fourth coil 4-38. According to some embodiments of the present disclosure, the third coil 4-36 may be electrically connected to the fourth coil 4-38.

According to some embodiments of the present disclosure, the first coil 4-33 may receive the first driving signal to drive the movable part frame 4-21 to move relative to the fixed part 4-10.

According to some embodiments of the present disclosure, the third coil 4-36 may receive the second driving signal to drive the movable part setting surface 4-22 to move relative to the movable part frame 4-21.

According to some embodiments of the present disclosure, the first driving signal may have a first frequency. According to some embodiments of the present disclosure, the second driving signal may have a second frequency.

According to some embodiments of the present disclosure, the second frequency may be different from the first frequency. According to some embodiments of the present disclosure, the second frequency may be greater than the first frequency.

According to some embodiments of the present disclosure, the first coil 4-33 may receive the first driving signal to generate a first driving force.

According to some embodiments of the present disclosure, the third coil 4-36 may receive the second driving signal to generate a second driving force.

According to some embodiments of the present disclosure, the first driving force may be applied to the movable part frame 4-21. According to some embodiments of the present disclosure, the second driving force may be applied to the movable part frame 4-21.

According to some embodiments of the present disclosure, the strength of the first driving force may be limited within a first range. According to some embodiments of the present disclosure, the strength of the second driving force may be limited within a second range.

According to some embodiments of the present disclosure, the maximum value of the first range and the maximum value of the second range may be different. According to some embodiments of the present disclosure, the maximum value of the first range may be greater than the maximum value of the second range.

According to some embodiments of the present disclosure, the volume of the first magnetic element 4-31 may be different from the volume of the third magnetic element 4-35. According to some embodiments of the present disclosure, the volume of the first magnetic element 4-31 may be greater than the volume of the third magnetic element 4-35.

According to some embodiments of the present disclosure, the volume of the first magnetic element 4-31 may be different from the volume of the fourth magnetic element 4-37. According to some embodiments of the present disclosure, the volume of the first magnetic element 4-31 may be greater than the volume of the fourth magnetic element 4-37.

According to some embodiments of the present disclosure, the volume of the second magnetic element 4-32 may be different from the volume of the third magnetic element 4-35. According to some embodiments of the present disclosure, the volume of the second magnetic element 4-32 may be greater than the volume of the third magnetic element 4-35.

According to some embodiments of the present disclosure, the volume of the second magnetic element 4-32 may be different from the volume of the fourth magnetic element 4-37. According to some embodiments of the present disclosure, the volume of the second magnetic element 4-32 may be greater than the volume of the fourth magnetic element 4-37.

According to some embodiments of the present disclosure, the volume of the first magnetic element 4-31 may be the same as the volume of the second magnetic element 4-32.

According to some embodiments of the present disclosure, the volume of the third magnetic element 4-35 may be the same as the volume of the fourth magnetic element 4-37.

In this way, the driving force of the driving assembly 4-30 may be effectively enhanced, and the effect of miniaturization may be achieved.

According to some embodiments of the present disclosure, the first magnetic element 4-31 may not overlap the second magnetic element 4-32 when viewed along the first axis 4-AX1.

According to some embodiments of the present disclosure, the first magnetic element 4-31 may at least partially overlap the third magnetic element 4-35 when viewed along the first axis 4-AX1.

According to some embodiments of the present disclosure, the first magnetic element 4-31 may not overlap the fourth magnetic element 4-37 when viewed along the first axis 4-AX1.

According to some embodiments of the present disclosure, the second magnetic element 4-32 may not overlap the third magnetic element 4-35 when viewed along the first axis 4-AX1.

According to some embodiments of the present disclosure, the second magnetic element 4-32 may at least partially overlap the fourth magnetic element 4-37 when viewed along the first axis 4-AX1.

According to some embodiments of the present disclosure, the third magnetic element 4-35 may not overlap the fourth magnetic element 4-37 when viewed along the first axis 4-AX1.

According to some embodiments of the present disclosure, the first magnetic element 4-31 may not overlap the second magnetic element 4-32 when viewed along the third axis 4-AX3.

According to some embodiments of the present disclosure, the first magnetic element 4-31 may not overlap the third magnetic element 4-35 when viewed along the third axis 4-AX3.

According to some embodiments of the present disclosure, the first magnetic element 4-31 may at least partially overlap the fourth magnetic element 4-37 when viewed along the third axis 4-AX3.

According to some embodiments of the present disclosure, the second magnetic element 4-32 may at least partially overlap the third magnetic element 4-35 when viewed along the third axis 4-AX3.

According to some embodiments of the present disclosure, the second magnetic element 4-32 may not overlap the fourth magnetic element 4-37 when viewed along the third axis 4-AX3.

According to some embodiments of the present disclosure, the third magnetic element 4-35 may not overlap the fourth magnetic element 4-37 when viewed along the third axis 4-AX3.

According to some embodiments of the present disclosure, when viewed along the second axis 4-AX2, the first magnetic element 4-31, the second magnetic element 4-32, the third magnetic element 4-35, and the fourth magnetic element 4-37 may not overlap each other.

In this way, the driving force of the driving assembly 4-30 may be effectively enhanced, and the effect of miniaturization may be achieved.

According to some embodiments of the present disclosure, when viewed along the first axis 4-AX1, the first magnetic element 4-31 may not overlap the first coil 4-33, the second coil 4-34, the third coil 4-36, and the fourth coil 4-38.

According to some embodiments of the present disclosure, when viewed along the first axis 4-AX1, the second magnetic element 4-32 may not overlap the first coil 4-33, the second coil 4-34, the third coil 4-36, and the fourth coil 4-38.

According to some embodiments of the present disclosure, when viewed along the first axis 4-AX1, the third magnetic element 4-35, the first coil 4-33, the second coil 4-34, the third coil 4-36 and the fourth coil 4-38 may not overlap.

According to some embodiments of the present disclosure, when viewed along the first axis 4-AX1, the fourth magnetic element 4-37 may not overlap the first coil 4-33, the second coil 4-34, the third coil 4-36, and the fourth coil 4-38.

According to some embodiments of the present disclosure, when viewed along the third axis 4-AX3, the first magnetic element 4-31 may partially overlap the first coil 4-33 and the fourth coil 4-38.

According to some embodiments of the present disclosure, when viewed along the third axis 4-AX3, the first magnetic element 4-31 may not overlap the second coil 4-34 and the third coil 4-36.

According to some embodiments of the present disclosure, when viewed along the third axis 4-AX3, the second magnetic element 4-32 may not overlap the first coil 4-33 and the fourth coil 4-38.

According to some embodiments of the present disclosure, when viewed along the third axis 4-AX3, the second magnetic element 4-32 may partially overlap the second coil 4-34 and the third coil 4-36.

According to some embodiments of the present disclosure, when viewed along the third axis 4-AX3, the third magnetic element 4-35 may not overlap the first coil 4-33 and the fourth coil 4-38.

According to some embodiments of the present disclosure, when viewed along the third axis 4-AX3, the third magnetic element 4-35 may partially overlap the second coil 4-34 and the third coil 4-36.

According to some embodiments of the present disclosure, when viewed along the third axis 4-AX3, the fourth magnetic element 4-37 may partially overlap the first coil 4-33 and the fourth coil 4-38.

According to some embodiments of the present disclosure, when viewed along the third axis 4-AX3, the fourth magnetic element 4-37 may not overlap the second coil 4-34 and the third coil 4-36.

According to some embodiments of the present disclosure, when viewed along the second axis 4-AX2, the first magnetic element 4-31 may not overlap the first coil 4-33, the second coil 4-34, the third coil 4-36, and the fourth coil 4-38.

According to some embodiments of the present disclosure, when viewed along the second axis 4-AX2, the second magnetic element 4-32 may not overlap the first coil 4-33, the second coil 4-34, the third coil 4-36, and the fourth coil 4-38.

According to some embodiments of the present disclosure, when viewed along the second axis 4-AX2, the third magnetic element 4-35 may not overlap the first coil 4-33, the second coil 4-34, the third coil 4-36, and the fourth coil 4-38.

According to some embodiments of the present disclosure, when viewed along the second axis 4-AX2, the fourth magnetic element 4-37 may not overlap the first coil 4-33, the second coil 4-34, the third coil 4-36, and the fourth coil 4-38.

In this way, the driving force of the driving assembly 4-30 may be effectively enhanced, and the effect of miniaturization may be achieved.

According to some embodiments of the present disclosure, the first coil 4-33 may not overlap the second coil 4-34 when viewed along the first axis 4-AX1.

According to some embodiments of the present disclosure, the first coil 4-33 may at least partially overlap the third coil 4-36 when viewed along the first axis 4-AX1.

According to some embodiments of the present disclosure, the first coil 4-33 may not overlap the fourth coil 4-38 when viewed along the first axis 4-AX1.

According to some embodiments of the present disclosure, the second coil 4-34 may not overlap the third coil 4-36 when viewed along the first axis 4-AX1.

According to some embodiments of the present disclosure, the second coil 4-34 may at least partially overlap the fourth coil 4-38 when viewed along the first axis 4-AX1.

According to some embodiments of the present disclosure, the third coil 4-36 may not overlap the fourth coil 4-38 when viewed along the first axis 4-AX1.

According to some embodiments of the present disclosure, the first coil 4-33 may not overlap the second coil 4-34 when viewed along the third axis 4-AX3.

According to some embodiments of the present disclosure, the first coil 4-33 may not overlap the third coil 4-36 when viewed along the third axis 4-AX3.

According to some embodiments of the present disclosure, the first coil 4-33 may at least partially overlap the fourth coil 4-38 when viewed along the third axis 4-AX3.

According to some embodiments of the present disclosure, the second coil 4-34 may at least partially overlap the third coil 4-36 when viewed along the third axis 4-AX3.

According to some embodiments of the present disclosure, the second coil 4-34 may not overlap the fourth coil 4-38 when viewed along the third axis 4-AX3.

According to some embodiments of the present disclosure, the third coil 4-36 may not overlap the fourth coil 4-38 when viewed along the third axis 4-AX3.

According to some embodiments of the present disclosure, when viewed along the second axis 4-AX2, the first coil 4-33, the second coil 4-34, the third coil 4-36, and the fourth coil 4-38 may not overlap each other.

In this way, the driving force of the driving assembly 4-30 may be effectively enhanced, and the effect of miniaturization may be achieved.

In general, the optical element driving mechanism of the embodiment of the present disclosure may increase the accuracy of the sensing element, thereby the operation of the optical element driving mechanism is smoother. In addition, the internal space of the optical element driving mechanism may be effectively used, thereby the effect of miniaturization is achieved. In addition, the driving force of the driving assembly may be effectively enhanced, so that the desired function may be achieved by using a smaller current.

Although embodiments of the present disclosure and their advantages have been described in detail, it should be understood that various changes, substitutions and alterations may be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. In addition, the scope of the present disclosure is defined by the scope of the appended claims. In addition, each scope of the claims is constructed as a separate embodiment, and various combinations of the claims and combinations of embodiments are within the scope of the present disclosure.

What is claimed is:

1. An optical element driving mechanism, comprising:
   a movable part, for connecting an optical element;
   a fixed part, wherein the movable part is movable relative to the fixed part; and
   a driving assembly, for driving the movable part to move relative to the fixed part,
   wherein the optical element is used to correspond to an electromagnetic wave,
   wherein the movable part further comprises a movable part setting surface,
   wherein the movable part setting surface is parallel to a first axis,
   wherein the movable part setting surface is perpendicular to a second axis,
   wherein the movable part setting surface is parallel to a third axis,
   wherein the first axis is perpendicular to the third axis,
   wherein the second axis is perpendicular to the first axis,
   wherein the second axis is perpendicular to the third axis,
   wherein the optical element driving mechanism having an elongated structure extends along the first axis when viewed along the second axis,
   wherein the driving assembly is used for driving the optical element to move relative to the fixed part in a first dimension,
   wherein the first dimension is a rotation about a first rotation axis, and
   wherein the first rotation axis is parallel to the first axis.

2. The optical element driving mechanism as claimed in claim 1, further comprising a sensing assembly and a stopping assembly,
   wherein the sensing assembly is used for sensing the movement of a movable part frame of the movable part relative to the fixed part,
   wherein the sensing assembly comprises:
   a reference element; and
   a sensing element, corresponding to the reference element, and used for outputting a sensing signal,
   wherein the reference element is movable relative to the sensing element,
   wherein the sensing element outputs the sensing signal between a first extreme value and a second extreme value,
   wherein there is an intermediate value between the first extreme value and the second extreme value.

3. The optical element driving mechanism as claimed in claim 2, wherein the stopping assembly is used for limiting the movement of the movable part frame relative to the fixed part within a first moving range, wherein when the movable part frame moves relative to the fixed part within the first moving range, the sensing signal is within a first setting range, wherein the first setting range is narrower than a first total range, wherein the first total range is defined as the difference between the second extreme value and the first extreme value.

4. The optical element driving mechanism as claimed in claim 3, wherein the interval of the first setting range comprises the intermediate value, wherein the interval of the first setting range does not comprise the first extreme value, wherein the interval of the first setting range does not comprise the second extreme value, wherein an avoidance range is defined as five percent of the first total range, wherein an applicable range is defined as a value that is respectively narrowed by the first extreme value and the second extreme value from the avoidance range.

5. The optical element driving mechanism as claimed in claim 4, wherein the first setting range is narrower than the applicable range, wherein the first setting range is within the applicable range, wherein the first setting range is defined as the difference between a second setting value and a first setting value, wherein the first setting value is within the applicable range, wherein the second setting value is within the applicable range.

6. The optical element driving mechanism as claimed in claim 5, wherein the reference element is used to generate a first magnetic field, wherein the sensing element senses the rotation of the movable part frame by sensing the change of the magnetic field direction of the first magnetic field, wherein the sensing element comprises a first magnetoresistive sensor, wherein the sensing element comprises:

a fixed layer, having a fixed magnetic field, and the fixed magnetic field has a fixed magnetic field direction;

a free layer, having a magnetizable material and being magnetized by the ambient magnetic field; and an intermediate layer, interposed between the fixed layer and the free layer.

7. The optical element driving mechanism as claimed in claim 6, wherein when the ambient magnetic field overlaps the free layer, the free layer is magnetized along a magnetization direction, wherein the magnetization direction is parallel to a first imaginary line, and the fixed magnetic field direction is parallel to a second imaginary line, wherein when the movable part frame is located at any position within the first moving range relative to the fixed part, the first imaginary line is not parallel to the second imaginary line, wherein when the movable part frame is located at any position within the first moving range relative to the fixed part, the included angle between the first imaginary line and the second imaginary line is always greater than 25 degrees.

8. The optical element driving mechanism as claimed in claim 7, wherein the reference element comprises a magnetic pole alignment direction, defined as an alignment direction in which the center of a south-seeking pole faces the center of a north-seeking pole, wherein the reference element does not overlap the sensing element when viewed along the first axis, wherein when viewed along the first axis, the alignment direction of the center of the reference element and the center of the sensing element is neither perpendicular nor parallel to the magnetic pole alignment direction, wherein the sensing assembly further comprises a magnetic conductive element, and the magnetic conductive element comprises a magnetic conductive material and corresponds to the reference element.

9. The optical element driving mechanism as claimed in claim 8, wherein when viewed along the first axis, the line that connects the center of the reference element and the center of the sensing element passes through the magnetic conductive element, wherein the sensing element with an elongated structure extends along a long axis when viewed along the first axis, wherein the long axis is not parallel to the magnetic pole alignment direction when viewed along the first axis, wherein the long axis is not perpendicular to the magnetic pole alignment direction when viewed along the first axis, wherein the driving assembly partially overlaps the sensing element when viewed along the first axis, wherein the driving assembly partially overlaps the sensing element when viewed along the third axis.

10. The optical element driving mechanism as claimed in claim 9, wherein the driving assembly comprises a first magnetic element, a second magnetic element, a first coil, and a second coil, wherein the first magnetic element of the driving assembly does not overlap the sensing element when viewed along the first axis, wherein the first magnetic element of the driving assembly partially overlaps the sensing element when viewed along the third axis, wherein the second magnetic element of the driving assembly does not overlap the sensing element when viewed along the first axis, wherein the second magnetic element of the driving assembly does not overlap the sensing element when viewed along the third axis.

11. The optical element driving mechanism as claimed in claim 10, wherein the first coil of the driving assembly does not overlap the sensing element when viewed along the first axis, wherein the first coil of the driving assembly partially overlaps the sensing element when viewed along the third axis, wherein the second coil of the driving assembly partially overlaps the sensing element when viewed along the first axis, wherein the second coil of the driving assembly does not overlap the sensing element when viewed along the third axis, wherein the driving assembly is used for driving the movable part frame to move relative to the fixed part in the first dimension, wherein the first dimension is a rotation about a first rotation axis, wherein the first rotation axis is parallel to the first axis.

12. The optical element driving mechanism as claimed in claim 11, further comprising a circuit assembly electrically connected to the driving assembly, wherein the circuit assembly comprises:

a first circuit element, comprising:

a first circuit element first contact, electrically connected to the first coil; and a first circuit element second contact, electrically connected to the second coil; and a second circuit element, comprising a second circuit element first contact, wherein the second circuit element first contact is electrically connected to the sensing element, wherein the surface of the first circuit element second contact is parallel to the surface of the first circuit element first contact, wherein the surface of the second circuit element first contact is not parallel to the surface of the first circuit element first contact.

13. The optical element driving mechanism as claimed in claim 12, wherein the fixed part comprises:

a first guiding groove, for accommodating a first wire of the first coil; and a second guiding groove, for accommodating a second wire of the second coil, wherein the extending direction of the first guiding groove is not parallel to the extending direction of the second guiding groove, wherein the first circuit element having a plate-like structure is not parallel to the second circuit element having a plate-like structure, wherein the first circuit element having a plate-like structure is perpendicular to the second circuit element having a plate-like structure.

14. The optical element driving mechanism as claimed in claim 1, further comprising a control assembly, wherein the driving assembly is used for driving the movable part setting surface of the movable part to move relative to the movable part frame in a second dimension, wherein the second dimension is different from the first dimension, wherein the optical element driving mechanism does not comprise any detection element for sensing the movement of the movable part setting surface, wherein the driving assembly receives a first driving signal output from the control assembly to drive the movable part frame to move relative to the fixed part, wherein the driving assembly receives a second driving signal output by the control assembly to drive the movable part setting surface to move relative to the movable part frame.

15. The optical element driving mechanism as claimed in claim 14, wherein the control assembly further comprises:

a first information, comprising the positional relationship of the sensing signal and the movable part frame relative to the fixed part; and a second information comprising the positional relationship of the second driving signal and the movable part setting surface relative to the movable part frame, wherein the control assembly outputs the first driving signal according to the sensing signal and the first information, wherein the control assembly and the sensing element have an integrated structure, wherein the control assembly and the sensing element are packaged into the same package.

16. The optical element driving mechanism as claimed in claim 15, wherein the driving assembly further comprises:

a third coil;
a third magnetic element, corresponding to the third coil;
a fourth coil; and a fourth magnetic element, corresponding to the fourth coil, wherein the first magnetic element corresponds to the first coil, wherein the second magnetic element corresponds to the second coil, wherein the first magnetic element is fixedly disposed on the movable part frame, wherein the second magnetic element is fixedly disposed on the movable part frame, wherein the third magnetic element is fixedly disposed on the movable part frame, wherein the fourth magnetic element is fixedly disposed on the movable part frame.

17. The optical element driving mechanism as claimed in claim 16, wherein the first coil is fixedly disposed on the fixed part, wherein the second coil is fixedly disposed on the fixed part, wherein the third coil is fixedly disposed on the fixed part, wherein the fourth coil is fixedly disposed on the fixed part, wherein the first coil and the third coil are electrically independent, wherein the first coil is electrically connected to the second coil, wherein the first coil receives the first driving signal to drive the movable part frame to move relative to the fixed part, wherein the third coil receives the second driving signal to drive the movable part setting surface to move relative to the movable part frame, wherein the first driving signal has a first frequency, wherein the second driving signal has a second frequency, wherein the second frequency is different from the first frequency, wherein the second frequency is greater than the first frequency.

18. The optical element driving mechanism as claimed in claim 17, wherein the first coil receives the first driving signal to generate a first driving force, wherein the third coil receives the second driving signal to generate a second driving force, wherein the first driving force is applied to the movable part frame, wherein the second driving force is applied to the movable part frame, wherein the strength of the first driving force is limited to within a first range, wherein the strength of the second driving force is limited to within a second range, wherein the maximum value of the first range is different from the maximum value of the second range, wherein the maximum value of the first range is greater than the maximum value of the second range, wherein the volume of the first magnetic element is different from the volume of the third magnetic element, wherein the volume of the first magnetic element is greater than the volume of the third magnetic element.

19. The optical element driving mechanism as claimed in claim 18, wherein the first magnetic element at least partially overlaps the third magnetic element when viewed along the first axis, wherein the first magnetic element does not overlap the second magnetic element when viewed along the first axis, wherein the first magnetic element does not overlap the second magnetic element when viewed along the third axis, wherein the first magnetic element at least partially overlaps the fourth magnetic element when viewed along the third axis.

\* \* \* \* \*